US011443016B2

(12) United States Patent
Candelore (10) Patent No.: US 11,443,016 B2
(45) Date of Patent: Sep. 13, 2022

(54) PRE-KEY WITH AUTHENTICATION USING LOGICAL COMBINATIONS OF PRE-KEY BITS WITH OTHER INFORMATION

(71) Applicant: SONY CORPORATION, Tokyo (JP)

(72) Inventor: Brant Candelore, Poway, CA (US)

(73) Assignee: Sony Corporation, Tokyo (JP)

( * ) Notice: Subject to any disclaimer, the term of this patent is extended or adjusted under 35 U.S.C. 154(b) by 406 days.

(21) Appl. No.: 16/597,677

(22) Filed: Oct. 9, 2019

(65) Prior Publication Data

US 2020/0151302 A1 May 14, 2020

Related U.S. Application Data

(60) Provisional application No. 62/758,151, filed on Nov. 9, 2018.

(51) Int. Cl.
| | |
|---|---|
| *G06F 21/00* | (2013.01) |
| *G06F 21/10* | (2013.01) |
| *H04N 21/6334* | (2011.01) |
| *H04N 21/4627* | (2011.01) |

(52) U.S. Cl.
CPC ......... *G06F 21/10* (2013.01); *H04N 21/4627* (2013.01); *H04N 21/63345* (2013.01); *G06F 2221/0755* (2013.01)

(58) Field of Classification Search
CPC ............ G06F 2221/0755; G06F 21/10; H04N 21/63345; H04N 21/4627
USPC ........................................................ 380/210
See application file for complete search history.

(56) References Cited

U.S. PATENT DOCUMENTS

| | | | |
|---|---|---|---|
| 5,548,648 A | 8/1996 | Yorke-Smith | |
| 6,560,337 B1 | 5/2003 | Peyravian et al. | |
| 6,700,989 B1* | 3/2004 | Itoh ...................... | G06T 1/0085 |
| | | | 348/460 |
| 7,366,302 B2* | 4/2008 | Candelore ............ | H04N 7/1675 |
| | | | 380/239 |
| 7,970,132 B2 | 6/2011 | Fahrny et al. | |
| 8,204,220 B2 | 6/2012 | Candelore | |
| 8,265,277 B2* | 9/2012 | Bonan .................. | H04N 21/435 |
| | | | 380/210 |
| 8,520,846 B2 | 8/2013 | Karroumi et al. | |
| 9,183,572 B2* | 11/2015 | Brubaker ........... | G06Q 30/0266 |
| 9,350,539 B2 | 5/2016 | Veugen et al. | |
| 9,813,248 B2 | 11/2017 | Bashyam et al. | |

(Continued)

FOREIGN PATENT DOCUMENTS

CN          103490889 B      3/2017

OTHER PUBLICATIONS

Brant Candelore, "Reducing Variable-Length Pre-Key to Fix-Length Key", Applicant's response to Non-Final Office Action filed Jun. 23, 2020 in related U.S. Appl. No. 16/183,532 dated Jun. 18, 2020.
Brant Candelore, "Reducing Variable-Length Pre-Key to Fix-Length Key", Non-Final Office Action related U.S. Appl. No. 16/183,532 dated Jun. 18, 2020.

(Continued)

*Primary Examiner* — Josnel Jeudy
(74) *Attorney, Agent, or Firm* — John L. Rogitz (57) ABSTRACT

A pre-key is combined with non-pre key data to render a content key useful for decrypting content, such as audio-video content. This other, non-pre key data may be anything that, for example, an ATSC 3.0 source such as a Broadcaster would like to authenticate into the content. For example, the data that is XOR'd with pre-key information may include various fields such as the Broadcaster designated market area (DMA), a copyright notice, the identification of the (Continued)

content to be decrypted, the user's group ID (subscriber group), etc.

20 Claims, 6 Drawing Sheets

(56) References Cited

U.S. PATENT DOCUMENTS

| | | | | |
|---|---|---|---|---|
| 10,097,879 | B1* | 10/2018 | Bates | H04N 21/251 |
| 2002/0080958 | A1 | 6/2002 | Ober et al. | |
| 2004/0139025 | A1* | 7/2004 | Coleman | G06Q 10/00 |
| | | | | 705/51 |
| 2005/0028192 | A1* | 2/2005 | Hooper | H04N 5/85 |
| | | | | 725/31 |
| 2010/0246819 | A1 | 9/2010 | Candelore | |
| 2010/0299313 | A1 | 11/2010 | Orsini et al. | |
| 2011/0167270 | A1* | 7/2011 | Lee | H04L 9/3271 |
| | | | | 713/170 |
| 2012/0166818 | A1 | 6/2012 | Orsini et al. | |
| 2017/0019376 | A1 | 1/2017 | Hars | |
| 2017/0105032 | A1* | 4/2017 | Davis | H04N 21/2541 |
| 2017/0272244 | A1 | 9/2017 | Morchon et al. | |
| 2018/0176637 | A1* | 6/2018 | Cho | H04N 21/64707 |
| 2018/0367309 | A1 | 12/2018 | Reinhold | |
| 2019/0020636 | A1* | 1/2019 | Gehring | H04W 12/0431 |
| 2019/0163902 | A1 | 5/2019 | Reid et al. | |

OTHER PUBLICATIONS

Brant Candelore, "Reducing Variable-Length Pre-Key to Fix-Length Key", Applicant's response to Final Office Action filed Jul. 17, 2020 from related U.S. Appl. No. 16/183,532.

Brant Candelore, "Reducing Variable-Length Pre-Key to Fix-Length Key", Final Office Action dated Jul. 7, 2020 from related U.S. Appl. No. 16/183,532.

U.S. Appl. No. 16/183,532, filed Nov. 7, 2018, Brant L. Candelore.

U.S. Appl. No. 16/597,677, filed oct. 9, 2019, Brant L. Candelore.

Brant Candelore, "Reducing Variable-Length Pre-Key to Fix-Length Key", file history of related U.S. Appl. No. 16/183,532, filed Nov. 7, 2018.

Brant Candelore, "Reducing Variable-Length Pre-Key to Fix-Length Key", related U.S. Appl. No. 16/183,532, Applicant's response to Non-Final Office Action filed Sep. 17, 2020.

Brant Candelore, "Reducing Variable-Length Pre-Key to Fix-Length Key", related U.S. Appl. No. 16/183,532, Non-Final Office Action dated Sep. 10, 2020.

Brant Candelore, "Reducing Variable-Length Pre-Key to Fix-Length Key", Applicant's response to Final Office Action filed Nov. 11, 2020 from related U.S. Appl. No. 16/183,532.

Brant Candelore, "Reducing Variable-Length Pre-Key to Fix-Length Key", Final Office Action dated Oct. 2, 2020 from related U.S. Appl. No. 16/183,532.

\* cited by examiner

FIG. 3    Transmitter logic

FIG. 4  Receiver logic

FIG. 5

Other Data Composition

Other Data can be anything that the Broadcaster would like to authenticate into the content. The data that is EXOR'ed could comprise various fields

- Broadcaster DMA
- Copyright Notice
- Content ID
- Group ID (subscriber group)

FIG. 6

PRE-KEY WITH AUTHENTICATION USING LOGICAL COMBINATIONS OF PRE-KEY BITS WITH OTHER INFORMATION

FIELD

This patent application relates to technically inventive, non-routine solutions that are necessarily rooted in computer technology and that produce concrete technical improvements.

BACKGROUND

The Advanced Television Systems Committee (ATSC) 3.0 standard is an Internet Protocol (IP)-based broadcasting standard that provides end-to-end delivery of IP-based content. ATSC 3.0 uses encryption keys to encrypt and decrypt content.

SUMMARY

As understood herein, to simplify decryption and to complicate hacking of keys, data different than pre-key bytes can be XOR'd with pre-key bytes and authenticated into a generated content decryption key. The data authenticated may identify the broadcaster and content to make it clear which content was being decoded. The present technique can allow an overlay of security on-top of existing digital rights management (DRM) security, as DRM security might be different from each of the broadcasters and techniques described herein can bridge them all.

A pre-key is combined with non-pre-key data to render a content key useful for decrypting content, such as audio-video content. This other, non-pre-key data may be anything that, for example, an ATSC 3.0 source such as a Broadcaster would like to authenticate into the content. For example, the data that is XOR'd with pre-key information may include various fields such as the Broadcaster designated market area (DMA), a copyright notice, the identification of the content to be decrypted, the user's group ID (subscriber group), etc.

Accordingly, an apparatus includes at least one computer storage that is not a transitory signal and that in turn includes instructions executable by at least one processor to receive a first pre-key receive a first pre-key. The instructions are executable to combine, using a logical operation, the first pre-key with information that is not part of the first pre-key from a broadcaster to render a first key for decrypting content, and to decrypt content using the first key.

In examples, the logical operation may include an exclusive-OR operation. In some implementations, the instructions may be executable to reduce a size of the first pre-key to render the first key. In such implementations, the instructions may be executable to reduce the size of the first pre-key by logical operation using first bits of the first pre-key but not using second bits of the first pre-key to render the first key having a size smaller than the size of the first pre-key. The instructions can be further executable to receive information identifying the first bits, and to use the information to execute the logical operation.

The apparatus may include the processor. The content may conform to the Advanced Television Systems Committee (ATSC) 3.0 standard. The computer storage can be embodied in a television or a set-top box.

In example embodiments, the information that is not part of the first pre-key may include one or more of a Broadcaster designated market area (DMA), a copyright notice, an identification of content to be decrypted, a user's group ID.

In another aspect, a method includes receiving a first key, combining the first key with information that is not part of the first pre-key to form a content key, and decrypting received content according to the content key.

In another aspect, an assembly includes at least one computer storage that is not a transitory signal and that in turn includes instructions executable by at least one processor to transmit a first pre-key. The instructions are executable to transmit information from a broadcaster that is not part of the first pre-key that a receiver is to use to render a first key for decrypting content. The information that is not part of the first pre-key includes one or more of a Broadcaster designated market area (DMA), a copyright notice, an identification of content to be decrypted, a user's group ID.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of computer networks that may include consumer electronics (CE) devices. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). The AVDD 12 may be an Android®-based system and the tuner may be an ATSC 3.0 tuner. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 and/or other computers described herein is configured to undertake present principles (e.g. communicate with other CE devices to undertake present principles, execute the logic described herein, and perform any other functions and/or operations described herein).

Figure 1:
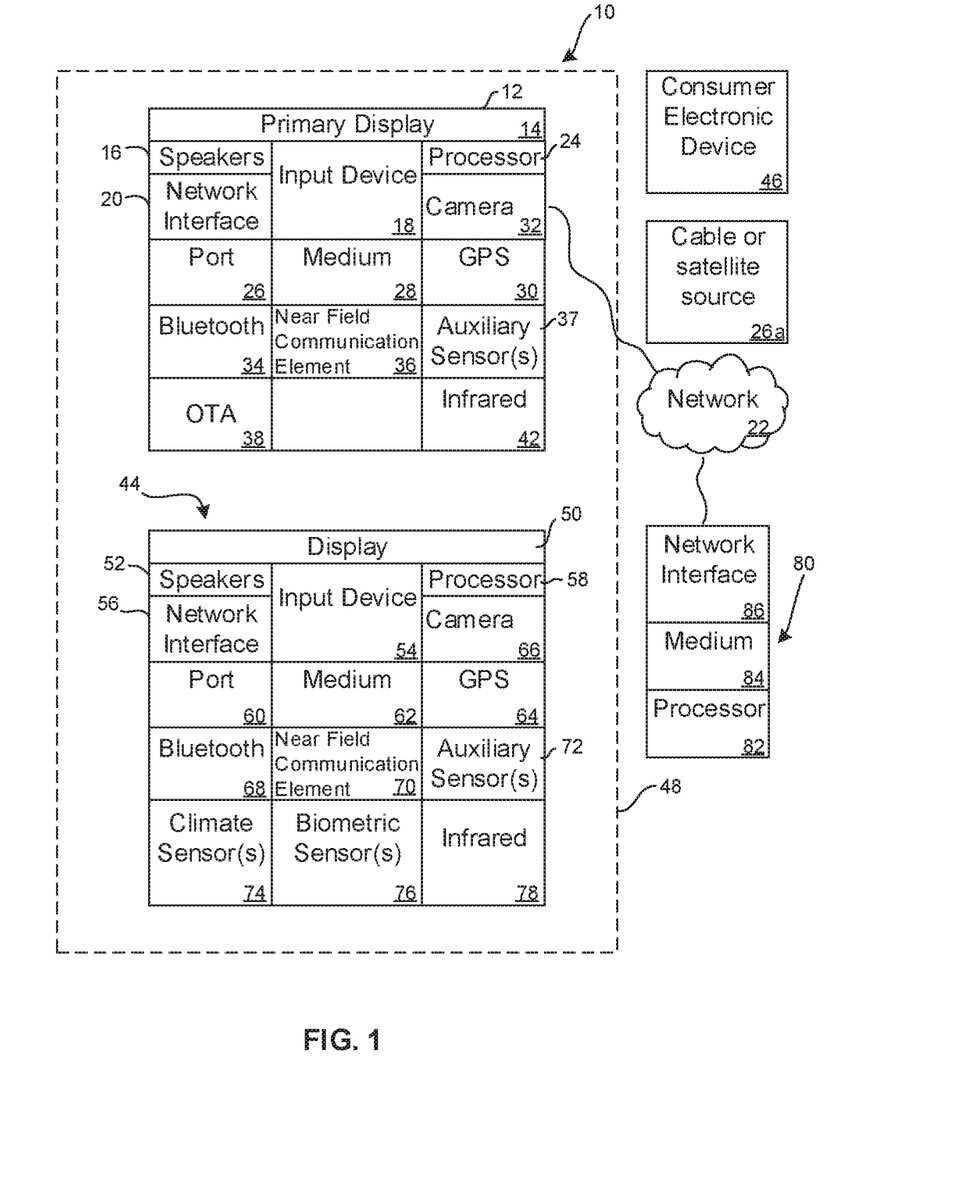
FIG. 1 is a block diagram of an example system including an example consistent with present principles.

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may or may not be touch-enabled for receiving user input signals via touches on the display. Present principles are particularly useful for the circumstance in which the display 14 is not touch-enabled. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below.

The AVDD 12 may further include one or more computer memories 28 such as disk-based or solid-state storage that are not transitory signals, in some cases embodied in the chassis of the AVDD as standalone devices or as a personal video recording device (PVR) or video disk player either internal or external to the chassis of the AVDD for playing back AV programs or as removable memory media. Also, in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor for receiving IR commands from a remote control, an optical sensor, a speed and/or cadence sensor, a gesture sensor (e.g. for sensing gesture command), etc.) providing input to the processor 24. The AVDD 12 may include an over-the-air TV broadcast port 38 for receiving OTA TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other computer device types that may include some or all of the components shown for the AVDD 12. In one example, a first device 44 and a second device 46 are shown and may include similar components as some or all of the components of the AVDD 12. Fewer or greater devices may be used than shown.

In the example shown, to illustrate present principles all three devices 12, 44, 46 are assumed to be members of a local network in, e.g., a dwelling 48, illustrated by dashed lines.

The example non-limiting first device 44 may include one or more touch-sensitive surfaces 50 such as a touch-enabled video display for receiving user input signals via touches on the display. The first device 44 may include one or more speakers 52 for outputting audio in accordance with present principles, and at least one additional input device 54 such as e.g. an audio receiver/microphone for e.g. entering audible commands to the first device 44 to control the device 44. The example first device 44 may also include one or more network interfaces 56 for communication over the network 22 under control of one or more processors 58. Thus, the interface 56 may be, without limitation, a Wi-Fi transceiver, which is an example of a wireless computer network interface, including mesh network interfaces. It is to be understood that the processor 58 controls the first device 44 to undertake present principles, including the other elements of the first device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first device 44 may also include one or more input ports 60 such as, e.g., a HDMI port or a USB port to physically connect (e.g. using a wired connection) to another computer device and/or a headphone port to connect headphones to the first device 44 for presentation of audio from the first device 44 to a user through the headphones. The first device 44 may further include one or more tangible computer readable storage medium 62 such as disk-based or solid-state storage. Also in some embodiments, the first device 44 can include a position or location receiver such as but not limited to a cellphone and/or GPS receiver and/or altimeter 64 that is configured to e.g. receive geographic position information from at least one satellite and/or cell tower, using triangulation, and provide the information to the device processor 58 and/or determine an altitude at which the first device 44 is disposed in conjunction with the device processor 58. However, it is to be understood that that another suitable position receiver other than a cellphone and/or GPS receiver and/or altimeter may be used in accordance with present principles to e.g. determine the location of the first device 44 in e.g. all three dimensions.

Continuing the description of the first device 44, in some embodiments the first device 44 may include one or more cameras 66 that may be, e.g., a thermal imaging camera, a digital camera such as a webcam, etc. Also included on the first device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first device 44 may include still other sensors such as e.g. one or more climate sensors 74 (e.g. barometers, humidity sensors, wind sensors, light sensors, temperature sensors, etc.) and/or one or more biometric sensors 76 providing input to the device processor 58. In addition to the foregoing, it is noted that in some embodiments the first device 44 may also include an infrared (IR) transmitter and/or IR receiver and/or IR transceiver 42 such as an IR data association (IRDA) device. A battery may be provided for powering the first device 44. The device 44 may communicate with the AVDD 12 through any of the above-described communication modes and related components.

The second device 46 may include some or all of the components described above.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers, controllers, and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

The devices described below may incorporate some or all of the elements described above.

The above methods may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
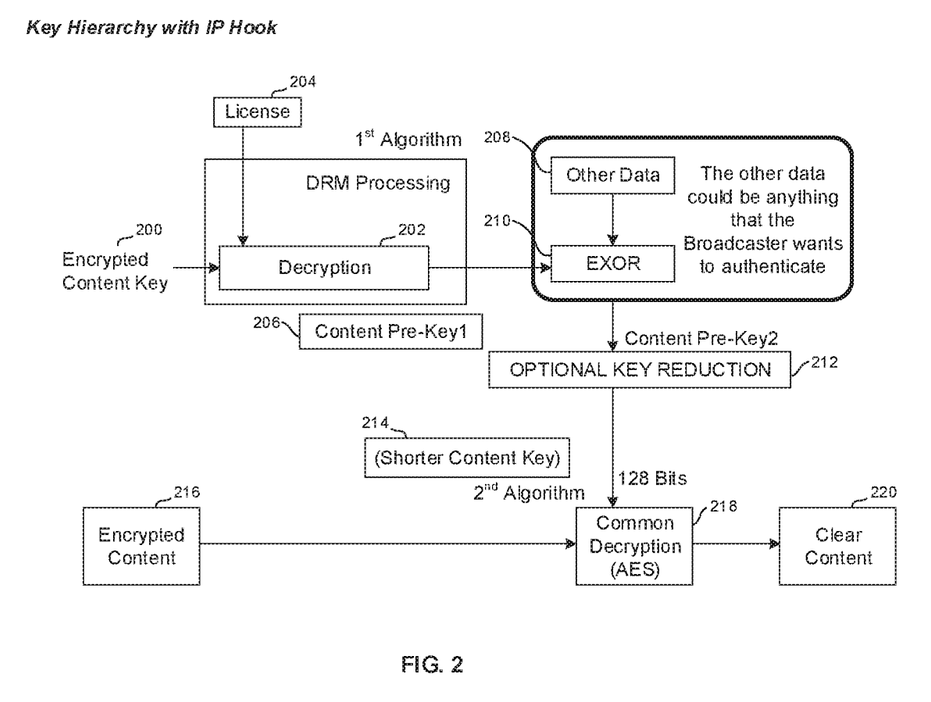
FIG. 2 is a block diagram showing key and content flow.

FIG. 2 schematically shows an example implementation in which an encrypted content key 200 is decrypted in a decryption block 202 using license information 204, such as may be embodied in a digital rights management (DRM) license. The output of the decryption block 202 is a pre-key 206.

The pre-key 206 is combined with other data 208 in a key combination block 210. In an example and as discussed further below, this combination may include logically combining bits in the pre-key 206 with the other data 208. An example logical operation is an XOR operation. The size of the pre-key after combining with other data may, if desired, by reduced in a key reduction block 212. U.S. Pat. No. 7,366,302, owned by the present assignee and incorporated herein by reference, and co-pending U.S. patent application Ser. No. 16/183,532, now U.S. Pat. No. 10,944,544, also incorporated herein by reference and owned by the present assignee, provide example key size reduction techniques that may be implemented in the reduction block 212. Note that additional aspects of the above-referenced U.S. patent application, such as using variable pre-key size, may be combined with present principles in, e.g., reduction block 212.

A content key 214 is the output of the combination block 210 (or when provided, the reduction block 212, in which case the content key 214 is smaller than the pre-key 200). The content key 210 generated from the pre-key 200 may be shorter than the pre-key and may be 128 bits in size.

The content key 214 is then used to decrypt content 216 such as audio-video content in a content decryption block 218. This may be done is some examples using Advanced Encryption Standard (AES) principles, although other encryption/decryption schemes may be used. The output of the content decryption block 218 is clear content 220 that can be played on an output device such as the AVDD 12 in FIG. 1.

Note that the elements of FIG. 2 may be implemented in a TV and/or a set-top box that incorporate any of the appropriate elements shown and described in reference to FIG. 1. The content being decrypted (and, hence, keys used to decrypt the content, where appropriate) may conform to the ATSC 3.0 standard.

Figure 3:
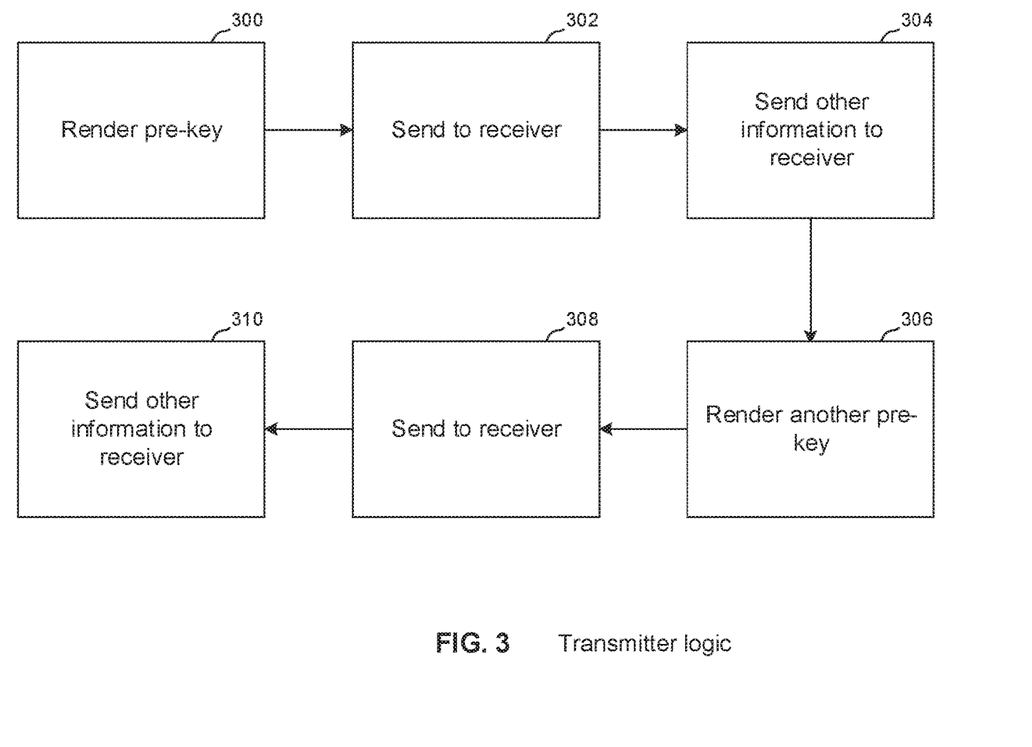
FIG. 3 is a flow chart of example transmitter logic consistent with present principles.

Attention is turned to FIG. 3, showing the logic that may be implemented by an example transmitter such as a computer network server that sends content and, in some cases, also the pre-keys and other decryption information to a receiver. Commencing at block 300, a pre-key is generated or rendered using key generation techniques. The pre-key is sent to one or more receivers at block 302. Along with the pre-key (i.e., in the same channel, or if desired in a different channel) information is sent at block 304 to the receiver(s) identifying other information to be combined with the pre-key to render a content key. The other information may include, for example, any one or more of Broadcaster designated market area (DMA), a copyright notice, the identification of the content to be decrypted, the user's group ID (subscriber group).

Blocks 306-310 indicate that the operations in blocks 300-304 may be subsequently repeated to provide a second pre-key. Thus, at block 306 a second pre-key is generated or rendered using key generation techniques. The second pre-key is sent to one or more receivers at block 308. Along with the second pre-key (i.e., in the same channel, or if desired in a different channel) other information is sent at block 310 to the receiver(s) for combining with the pre-key according to principles discussed herein.

Figure 4:
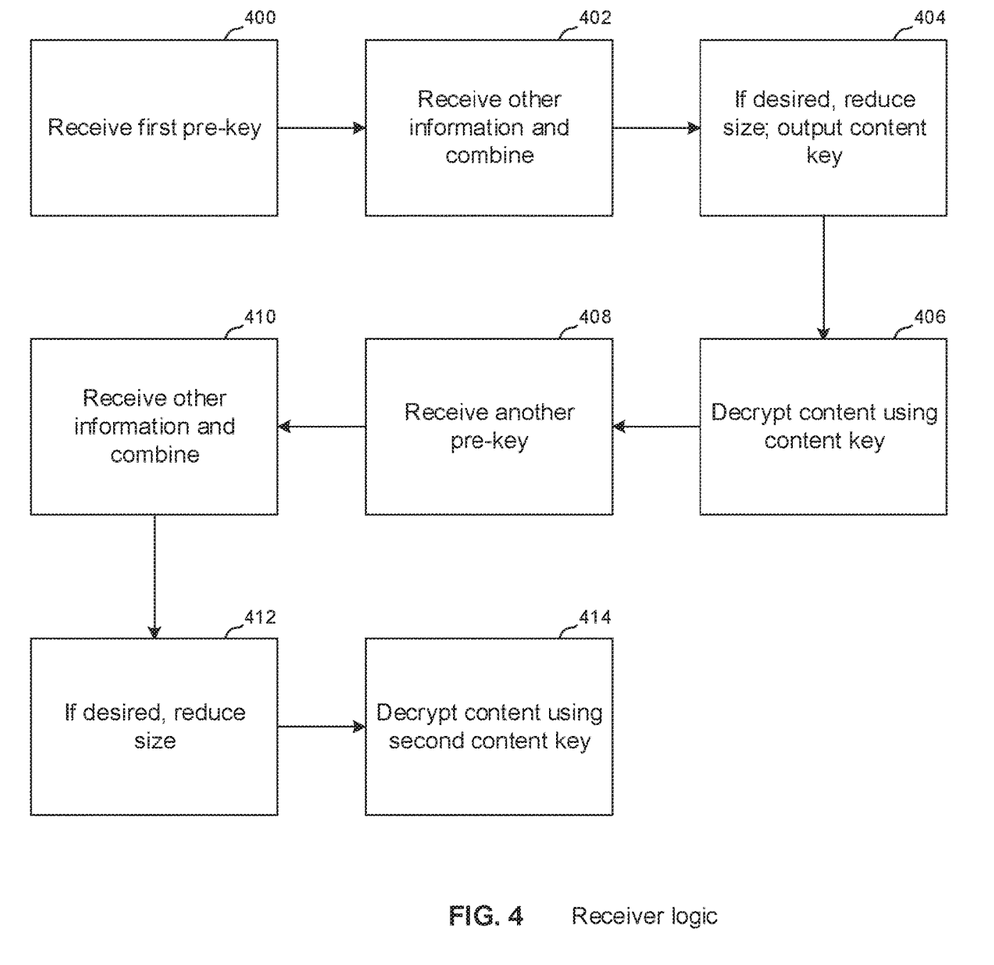
FIG. 4 is a flow chart of example receiver logic consistent with present principles.

FIG. 4 illustrates receiver-side logic. Commencing at block 400, the first pre-key from FIG. 3 is received, and at block 402 the information from block 304 is also received and combined with the pre-key using, e.g., an XOR operation. Moving to block 404, if desired the size of the pre-key after combining it with the other information is reduced. In any case, a content key is rendered, and content is then decrypted at block 406 using the content key.

As disclosed in the above-referenced U.S. patent application, when key size reduction is implemented at optional block 404, the pre-key after combining it with non-pre-key information at block 402 may be thought of as a first pre-key having a first size. Block 404 reduces the first size by a logical operation using first bits of the first pre-key but not using second bits of the first pre-key to render the content key which has a size smaller than the first size. In such as case, information identifying the first bits may be received from the transmitter to be used to execute the logical operation at block 404. The information may identify the first size. At least one byte of the first pre-key is not used to generate any byte of the content key. In addition, the information from the transmitter may indicate a first offset indicating the location of the first of the designated upper bytes of the first pre-key output from block 402 along with the of bytes to be combined, and a second offset indicating the location in the lower bytes at which logical combining is to commence to reduce the size of the pre-key. The information may also include an indication that only a subset of the upper bytes are to be used and that the remaining bytes in the upper bytes of the pre-key output from block 404 are to be discarded.

Blocks 408-414 indicate that the second pre-key from blocks 306-310 in FIG. 3 may be used to decrypt second content. Thus, at block 408, the second pre-key from FIG. 3 is received, and at block 410 the information from block 310 is also received and combined with the pre-key. Moving to block 412, the second pre-key after combining it with the non-pre-key information may be reduced to render a content key. Content is then decrypted at block 414 using the second content key.

Figure 5:
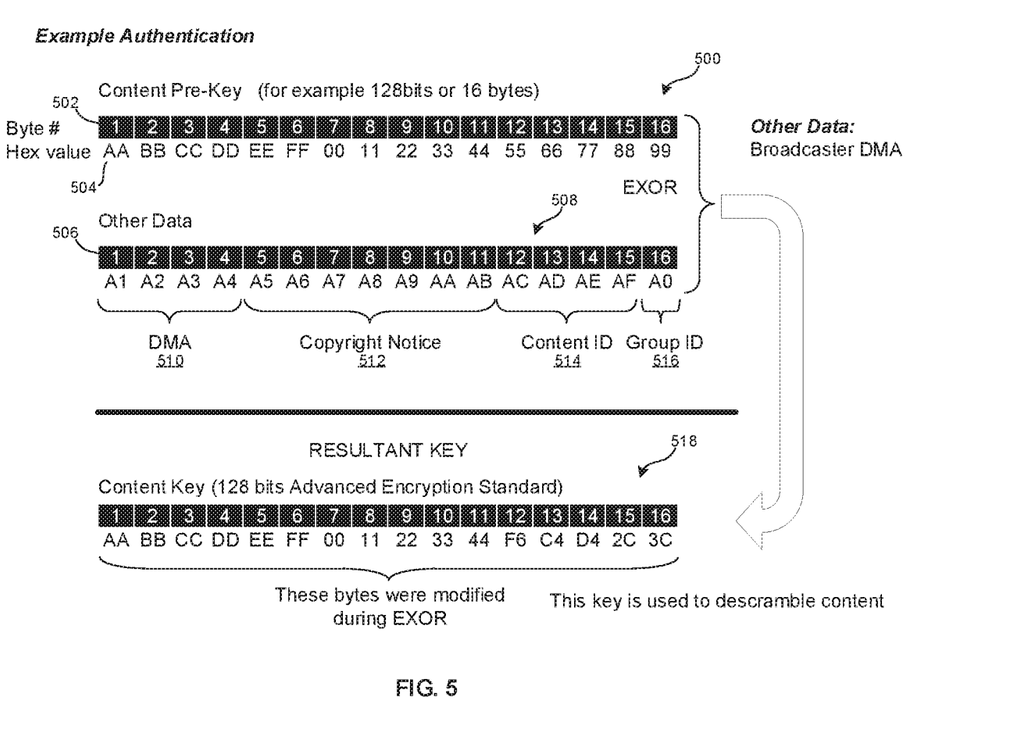
FIG. 5 is a schematic diagram showing am illustrative pre-key reduction to the decryption key.

FIG. 5 provides an example of the above disclosure. In FIG. 5, a pre-key 500 of, for example, 128 bits or 16 bytes is shown, illustrated schematically as having sixteen (16) bytes 502 each with a respective byte value 504 such as a hexadecimal value. In the non-limiting example shown, the bytes of the pre-key 500 are to be logically combined (e.g., on a byte-by-byte basis using XOR) with corresponding bytes 506 of other, non-pre-key data 508. In the non-limiting example of FIG. 5, the other, non-pre-key data 508 includes four bytes of DMA data 510, seven bytes of copyright notice data 512, four bytes of content identification data 514, and two bytes of Group (subscriber) ID data 516. A content key 518 is the result of the combination, in which all the bytes of the content key are modified versions of the bytes of the pre-key 500.

Figure 6:
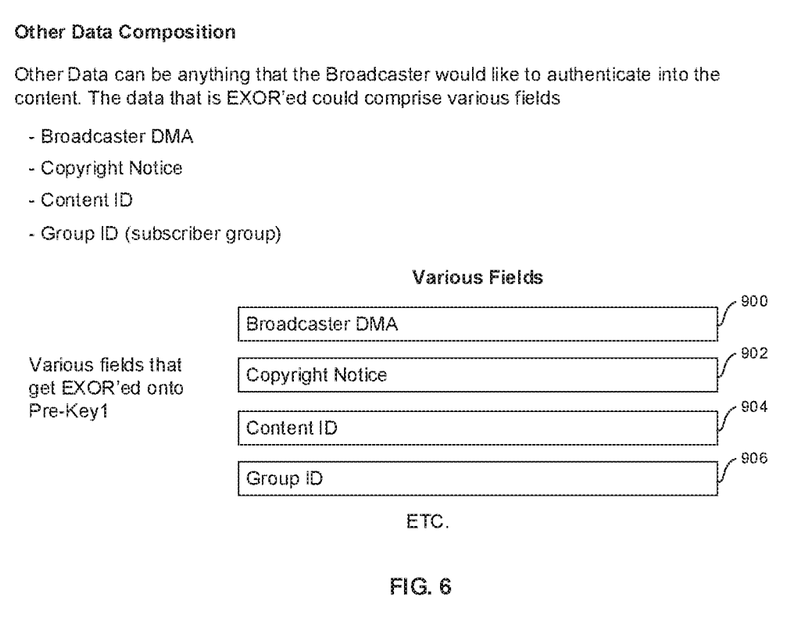
FIG. 6 is a schematic diagram of an example pre-key data structure consistent with present principles.

FIG. 6 illustrates an example information data structure that may be sent to the receiver at block 304 in FIG. 3 and received at block 402 in FIG. 4, for use along the lines illustrated by the example of FIG. 5. A field 900 contains broadcaster DMA data, a second field 902 contains a copyright notice, a third field 904 contains the identification of the content to be decrypted using the content key generated as described herein, and a fourth field 906 include a group ID that may be a subscriber group ID.

It will be appreciated that whilst present principals have been described with reference to some example embodiments, these are not intended to be limiting, and that various alternative arrangements may be used to implement the subject matter claimed herein.

What is claimed is:

1. An apparatus, comprising:
   at least one computer storage that is not a transitory signal and that comprises instructions executable by at least one processor to:
   receive a first pre-key; and
   combine, using a logical operation, the first pre-key with information that is not part of the first pre-key from a broadcaster to render a first key for decrypting content;
   decrypt content using the first key, wherein the information that is not part of the first pre-key comprises at least a Broadcaster designated market area (DMA) and a copyright notice.

2. The apparatus of claim 1, wherein the logical operation comprises an exclusive-OR operation.

3. The apparatus of claim 1, wherein the instructions are executable to:
   reduce a size of the first pre-key to render the first key.

4. The apparatus of claim 3, wherein the instructions are executable to:
   reduce the size of the first pre-key by logical operation using first bits of the first pre-key but not using second bits of the first pre-key to render the first key having a size smaller than the size of the first pre-key.

5. The apparatus of claim 4, wherein the instructions are executable to:
   receive information identifying the first bits; and
   use the information to execute the logical operation.

6. The apparatus of claim 1, comprising the at least one processor.

7. The apparatus of claim 1, wherein the content conforms to the Advanced Television Systems Committee (ATSC) 3.0 standard.

8. The apparatus of claim 1, wherein the computer storage is embodied in a television.

9. The apparatus of claim 1, wherein the computer storage is embodied in a set-top box.

10. The apparatus of claim 1, wherein the information that is not part of the first pre-key comprises an identification of content to be decrypted.

11. The apparatus of claim 1, wherein the information that is not part of the first pre-key comprises a user's group ID.

12. A method comprising:
    receiving a first key;
    combining the first key with information that is not part of the first key to form a content key; and
    decrypting received content according to the content key, wherein the information that is not part of the first pre-key comprises at least a Broadcaster designated market area (DMA) and a copyright notice.

13. The method of claim 12, wherein the content key is smaller than the first key.

14. The method of claim 12, wherein the information that is not part of the first key comprises one or more of an identification of content to be decrypted, a user's group ID.

15. An assembly, comprising:
    at least one computer storage that is not a transitory signal and that comprises instructions executable by at least one processor to:
    transmit a first pre-key;
    transmit information from a broadcaster that is not part of the first pre-key that a receiver is to use to render a first key for decrypting content, the information that is not part of the first pre-key comprising at least two of a Broadcaster designated market area (DMA), a copyright notice, an identification of content to be decrypted, a user's group ID.

16. The assembly of claim 15, comprising the at least one processor.

17. The assembly of claim 15, wherein the first key conforms to the Advanced Television Systems Committee (ATSC) 3.0 standard.

18. The assembly of claim 15, comprising the receiver.

19. The apparatus of claim 5, wherein the information identifying the first bits comprises the size smaller than the size of the first pre-key.

20. The apparatus of claim 5, wherein the information identifying the first bits comprises a first offset indicating a location of the first bits.

* * * * *